US011499468B2

United States Patent
Kidd et al.

(10) Patent No.: US 11,499,468 B2
(45) Date of Patent: Nov. 15, 2022

(54) SYSTEMS AND METHODS FOR USING OXYGEN TO DIAGNOSE IN-RANGE RATIONALITY FOR NOX SENSORS

(71) Applicant: Cummins, Inc., Columbus, IN (US)

(72) Inventors: Adam W. Kidd, Indianapolis, IN (US); Michael Haas, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 17/246,893

(22) Filed: May 3, 2021

(65) Prior Publication Data

US 2021/0254534 A1 Aug. 19, 2021

Related U.S. Application Data

(63) Continuation of application No. 15/776,342, filed as application No. PCT/US2016/062065 on Nov. 15, 2016, now Pat. No. 10,995,647.

(60) Provisional application No. 62/258,027, filed on Nov. 20, 2015.

(51) Int. Cl.
*F01N 11/00* (2006.01)
*F01N 9/00* (2006.01)

(52) U.S. Cl.
CPC ............ *F01N 11/007* (2013.01); *F01N 9/005* (2013.01); *F01N 9/007* (2013.01); *F01N 2560/025* (2013.01); *F01N 2560/026* (2013.01); *F01N 2900/0416* (2013.01)

(58) Field of Classification Search
CPC combination set(s) only.
See application file for complete search history.

(56) References Cited

U.S. PATENT DOCUMENTS

| | | |
|---|---|---|
| 7,921,706 B2 | 4/2011 | Sumitani |
| 7,930,932 B2 | 4/2011 | Kariya et al. |
| 7,987,661 B2 * | 8/2011 | Jung ..................... F02D 41/222 60/277 |
| 8,087,290 B2 | 1/2012 | Wickert et al. |
| 8,219,278 B2 | 7/2012 | Sawada et al. |
| 8,307,699 B2 | 11/2012 | Sawada et al. |
| 8,359,826 B2 | 1/2013 | Kitazawa |
| 8,512,531 B2 | 8/2013 | Sasaki |
| 8,694,197 B2 | 4/2014 | Rajagopalan et al. |
| 8,813,546 B2 | 8/2014 | Takahashi et al. |
| 9,599,006 B2 | 3/2017 | Genslak et al. |
| 9,617,900 B2 | 4/2017 | Hagiwara et al. |

(Continued)

OTHER PUBLICATIONS

International Search Report and Written Opinion for International Application No. PCT/US2016/062065, dated Feb. 1, 2017, 9 pages.

*Primary Examiner* — Binh Q Tran
(74) *Attorney, Agent, or Firm* — Foley & Lardner LLP

(57) ABSTRACT

A method includes: interpreting first oxygen data acquired by a first nitrous oxide (NOx) sensor indicative of a first amount of oxygen in an exhaust flow at a location in or proximate to an exhaust aftertreatment system, wherein the exhaust aftertreatment system is in exhaust gas receiving communication with an engine; estimating an amount of oxygen in the exhaust flow entering the exhaust aftertreatment system from the engine based on engine operation data; and, determining that the NOx sensor is faulty based on determining that a difference between the first amount of oxygen and the estimated amount of oxygen is greater than a threshold value.

20 Claims, 4 Drawing Sheets

(56) References Cited

U.S. PATENT DOCUMENTS

| | | |
|---|---|---|
| 9,670,817 B2 * | 6/2017 | Yoo .................. F01N 3/2066 |
| 9,927,413 B2 * | 3/2018 | Gong ................. G01N 33/007 |
| 10,190,457 B2 | 1/2019 | Suzuki et al. |
| 10,378,467 B2 | 8/2019 | Inoshita et al. |
| 10,995,647 B2 * | 5/2021 | Kidd ..................... F01N 11/00 |
| 2002/0017467 A1 * | 2/2002 | Ando ................ F02D 41/2474 |
| | | 205/781 |
| 2002/0162743 A1 * | 11/2002 | Inagaki ............. G01N 27/4065 |
| | | 204/425 |
| 2004/0006971 A1 | 1/2004 | Kamoto et al. |
| 2004/0040289 A1 | 3/2004 | Mazur et al. |
| 2007/0234708 A1 | 10/2007 | Jones et al. |
| 2011/0016949 A1 * | 1/2011 | Sasaki ............... G01N 27/4175 |
| | | 73/23.31 |
| 2011/0100842 A1 * | 5/2011 | Handler ............ G01N 27/4175 |
| | | 205/781 |
| 2014/0331752 A1 | 11/2014 | Hall et al. |
| 2015/0047339 A1 | 2/2015 | Rollinger et al. |
| 2015/0068295 A1 | 3/2015 | Kowalkowski et al. |
| 2015/0113953 A1 | 4/2015 | Nilsson |
| 2016/0169135 A1 | 6/2016 | Von Der Ehe et al. |
| 2016/0237875 A1 | 8/2016 | Hagiwara et al. |

\* cited by examiner

SYSTEMS AND METHODS FOR USING OXYGEN TO DIAGNOSE IN-RANGE RATIONALITY FOR NOX SENSORS

CROSS-REFERENCE TO RELATED PATENT APPLICATIONS

This application is a continuation of U.S. patent application Ser. No. 15/776,342 entitled "SYSTEMS AND METHODS FOR USING OXYGEN TO DIAGNOSE IN-RANGE RATIONALITY FOR NOx SENSORS," filed May 15, 2018, which is a national phase application of PCT Application No. PCT/US2016/062065 entitled "SYSTEMS AND METHODS FOR USING OXYGEN TO DIAGNOSE IN-RANGE RATIONALITY FOR NOx SENSORS," filed Nov. 15, 2016, which claims priority to and the benefit of U.S. Provisional Patent Application No. 62/258,027, filed Nov. 20, 2015, all of which are incorporated herein by reference in their entireties.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides (NOx), hydrocarbons, and other environmentally harmful pollutants. However, the components that make up the exhaust aftertreatment system can be susceptible to failure and degradation. Because the failure or degradation of components may have adverse consequences on performance and the emission-reduction capability of the exhaust aftertreatment system, the detection and, if possible, correction of failed or degraded components is desirable.

SUMMARY

One embodiment relates to an apparatus. The apparatus includes an exhaust analysis circuit and a sensor diagnostics circuit. The exhaust analysis circuit is structured to interpret first oxygen data acquired by a first sensor indicative of a first amount of oxygen in an exhaust flow at a first location along an exhaust aftertreatment system, and interpret second oxygen data acquired by a second sensor indicative of a second amount of oxygen in the exhaust flow at a second location along the exhaust aftertreatment system. The sensor diagnostic circuit is structured to determine at least one of the first sensor and the second sensor are faulty based on the first amount of oxygen and the second amount of oxygen differing more than a threshold value. The exhaust aftertreatment system is in exhaust gas receiving communication with an engine.

Another embodiment relates to a method. The method includes receiving first oxygen data from a first sensor indicative of a first amount of oxygen in an exhaust flow at a first location along an exhaust aftertreatment system in exhaust gas receiving communication with an engine; receiving second oxygen data from a second sensor indicative of a second amount of oxygen in the exhaust flow at a second location along the exhaust aftertreatment system; and determining at least one of the first sensor and the second sensor are faulty based on the first amount of oxygen and the second amount of oxygen differing more than a threshold value.

Another embodiment relates to a system. The system includes an exhaust aftertreatment system and a controller. The controller is structured to receive first oxygen data from a first sensor indicative of a first amount of oxygen in an exhaust flow at a first location along the exhaust aftertreatment system; receive second oxygen data from a second sensor indicative of a second amount of oxygen in the exhaust flow at a second location along the exhaust aftertreatment system; and determine at least one of the first sensor and the second sensor are faulty based on the first amount of oxygen and the second amount of oxygen differing more than a threshold value.

These and other features, together with the organization and manner of operation thereof, will become apparent from the following detailed description when taken in conjunction with the accompanying drawings.

DETAILED DESCRIPTION

Figure 1:
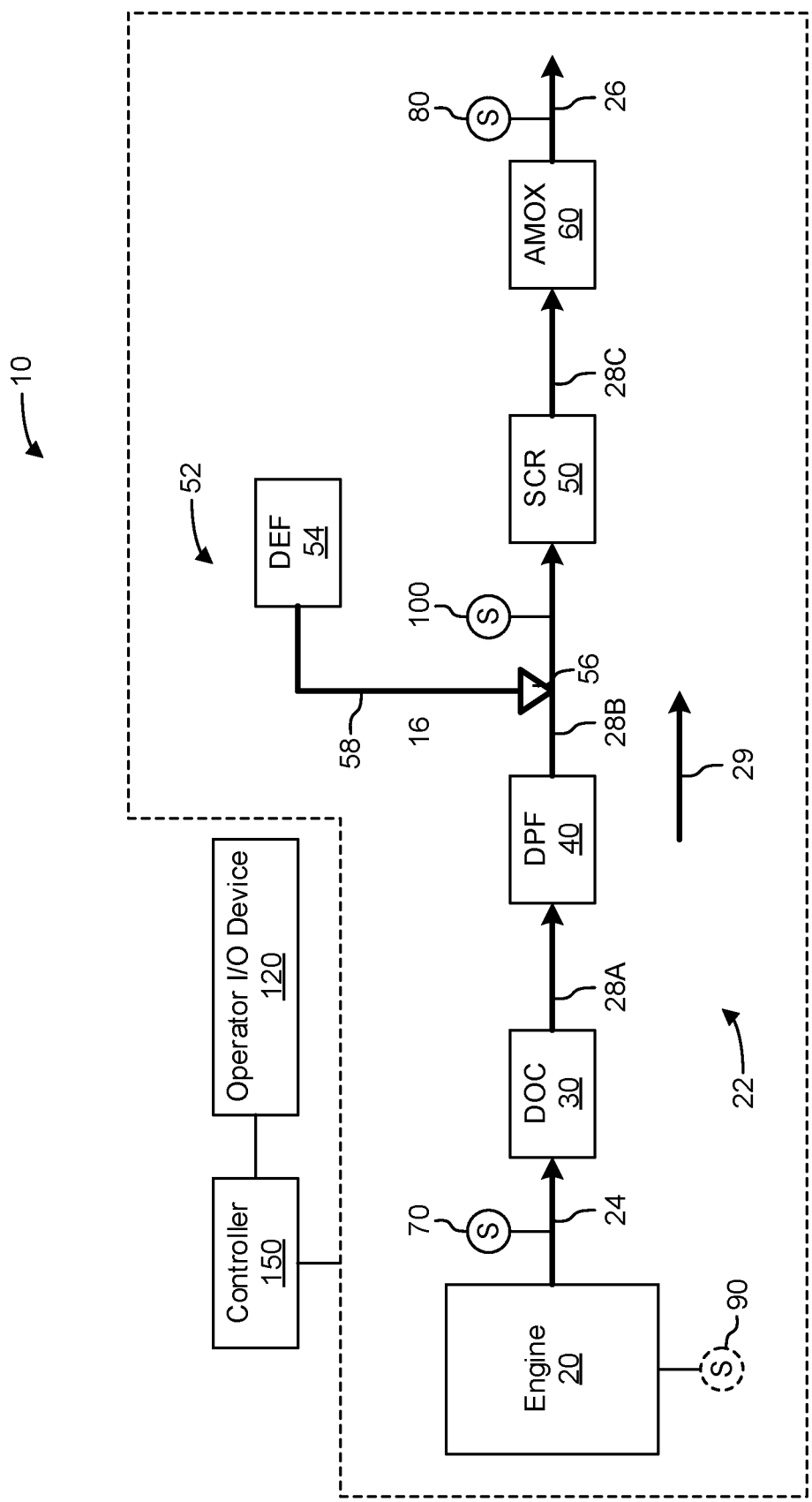
FIG. 1 is a schematic diagram of an exhaust aftertreatment system with a controller, according to an example embodiment.

Referring to the Figures generally, the various embodiments disclosed herein relate to systems, methods, and apparatuses for using oxygen data to diagnose in-range rationality of NOx sensors in an exhaust aftertreatment system. According to the present disclosure, a controller may perform a diagnostic procedure to determine whether one or more sensors (e.g., NOx sensors, oxygen sensors, etc.) of an exhaust aftertreatment system are faulty based on the amount of oxygen within the exhaust flow at various locations of the exhaust aftertreatment system. Typically, to diagnose a fault of one or more NOx sensors, complex models are used to estimate an amount of NOx at a location of the exhaust aftertreatment system. The estimate is then compared to the actual amount of NOx at the location measured by a NOx sensor. However, these models are frequently inaccurate as it can be difficult to estimate NOx accurately at a location due to the components of the exhaust aftertreatment system upstream of the NOx sensor constantly converting different amounts of the hydrocarbons and NOx of the exhaust flow into less harmful emission constituents.

However, according to an example embodiment, Applicants have determined that the amount of oxygen within the exhaust aftertreatment system remains substantially constant as the hydrocarbons and NOx are converted into less harmful emission constituents. According to one embodiment, NOx sensors are structured to measure both oxygen content and NOx content within an exhaust flow. Thus, if it can be determined that a NOx sensor is inaccurately reading oxygen content, the NOx sensor may be also measuring NOx content inaccurately (e.g., greater than 95% of the time, etc.). Therefore, the health of a NOx sensor may be partially diagnosed by the oxygen reading. In one embodiment, the oxygen readings of two sensors are compared and if they differ, they are compared to an oxygen estimate of oxygen exiting the engine. Based on the comparison, one or both of the sensors may be diagnosed as being faulty based on the estimated and measure oxygen contents. In another embodiment, the oxygen readings of three sensors are compared such that if one differs from the other two, the differing sensor may be determined to be faulty.

In one embodiment, a passive diagnostic test may be performed while the engine and exhaust aftertreatment system are operational. For example, if embodied in a vehicle, the passive test may be performed while the operator is driving the vehicle. If an error or fault is detected, a fault code or indicator lamp may be actuated to alert the operator of maintenance or service that may be required. In contrast and in another embodiment, an intrusive diagnostic test may be performed. As used herein, the term "intrusive" (in regard to performing one or more diagnostic tests) is used to refer to an active diagnostic test. In other words, an intrusive method, system, and apparatus describe a diagnostic test or protocol that is forced to run on the engine and exhaust aftertreatment system (e.g., causes the engine to operate at a certain speed, etc.). An intrusive diagnostic test may manipulate or excite the NOx emissions in the exhaust gas emitted from the engine system. In this regard, an "intrusive diagnostic test" may include overriding various set engine operating points to perform the diagnostic test. For example, many engine operating points are set to be in compliance with one or more vehicular laws (e.g., emissions, etc.). By overriding one or more of these operating points, the engine may be forced into non-compliance with one or more vehicular laws. As a result, the active or intrusive diagnostic test is often run in a service bay, test center environment, or other controlled environment.

Referring now to FIG. 1, an engine system, shown as engine system 10, with a controller 150 is shown, according to an example embodiment. As shown in FIG. 1, the engine system 10 includes an internal combustion engine, shown as engine 20, and an aftertreatment system, shown as exhaust aftertreatment system 22. The exhaust aftertreatment system 22 is in exhaust gas-receiving communication with the engine 20. According to one embodiment, the engine 20 is structured as a compression-ignition internal combustion engine that utilizes diesel fuel. However, in various alternate embodiments, the engine 20 may be structured as any other type of engine (e.g., spark-ignition, etc.) that utilizes any type of fuel (e.g., gasoline, natural gas, etc.). Within the engine 20, air from the atmosphere is combined with fuel, and combusted, to power the engine 20. Combustion of the fuel and air in the compression chambers of the engine 20 produces exhaust gas that is operatively vented to an exhaust manifold and to the exhaust aftertreatment system 22.

In the example depicted, the exhaust aftertreatment system 22 includes a diesel oxidation catalyst (DOC) 30, a diesel particular filter (DPF) 40, a selective catalytic reduction (SCR) system 52 with a SCR catalyst 50, and an ammonia oxidation (AMOx) catalyst 60. The SCR system 52 further includes a reductant delivery system that has a reductant source, shown as diesel exhaust fluid (DEF) source 54, that supplies reductant (e.g., DEF, ammonia, etc.) to a reductant doser, shown as DEF doser 56, via a reductant line, shown as DEF line 58. It should be noted that the components of the exhaust aftertreatment system 22 may be in any order, or different components and/or a different aftertreatment architecture may be used. For example, the AMOx catalyst 60 may be omitted. In another example, the SCR system 52 may include multiple DEF dosers 56 positioned along the exhaust aftertreatment system 22. Although the exhaust aftertreatment system 22 shown includes one of a DOC 30, DPF 40, SCR catalyst 50, and AMOx catalyst 60 positioned in specific locations relative to each other along the exhaust flow path, in other embodiments, the exhaust aftertreatment system 22 may include more than one of any of the various catalysts positioned in any of various positions relative to each other along the exhaust flow path as desired. Therefore, the architecture of the exhaust aftertreatment system 22 shown in FIG. 1 is for illustrative purposes and should not be limiting.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC 30 into a first section of exhaust piping 28A. From the first section of exhaust piping 28A, the exhaust gas flows into the DPF 40 and exits the DPF 40 into a second section of exhaust piping 28B. From the second section of exhaust piping 28B, the exhaust gas flows into the SCR catalyst 50 and exits the SCR catalyst 50 into the third section of exhaust piping 28C. As the exhaust gas flows through the second section of exhaust piping 28B, it may be periodically dosed with reductant (e.g., DEF, urea, etc.) by the DEF doser 56. Accordingly, the second section of exhaust piping 28B may act as a decomposition chamber or tube to facilitate the decomposition of the reductant to ammonia. From the third section of exhaust piping 28C, the exhaust gas flows into the AMOx catalyst 60 and exits the AMOx catalyst 60 into outlet piping 26 before the exhaust gas is expelled from the exhaust aftertreatment system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOX catalyst 60. However, in alternative embodiments, other arrangements of the components of the exhaust aftertreatment system 22 are also possible.

The DOC 30 may have any of various flow-through designs. Generally, the DOC 30 is structured to oxidize at least some particulate matter, e.g., the soluble organic fraction of soot, in the exhaust and reduce unburned hydrocarbons and CO in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC 30 to oxidize NO into $NO_2$. In this manner, the level of $NO_2$ exiting the DOC 30 is equal to the $NO_2$ in the exhaust gas generated by the engine 20 plus the $NO_2$ converted from NO by the DOC 30.

In addition to treating the hydrocarbon and CO concentrations in the exhaust gas, the DOC 30 may also be used in the controlled regeneration of the DPF 40, the SCR catalyst 50, and the AMOx catalyst 60. This can be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, the SCR catalyst 50, and/or the AMOx catalyst 60. The amount of unburned HC added to the exhaust gas is selected to achieve the desired temperature increase or target controlled regeneration temperature.

The DPF 40 may be any of various flow-through or wall-flow designs, and is structured to reduce particulate matter concentrations, e.g., soot and ash, in the exhaust gas to meet or substantially meet requisite emission standards. The DPF 40 captures particulate matter and other constituents, and thus may need to be periodically regenerated to burn off the captured constituents. Additionally, the DPF 40 may be structured to oxidize NO to form $NO_2$ independent of the DOC 30.

As discussed above, the SCR system 52 may include a reductant delivery system with a reductant (e.g., DEF, etc.) source 54, a pump, and a delivery mechanism or doser 56. The reductant source 54 can be a container or tank capable of retaining a reductant, such as, for example, ammonia ($NH_3$), DEF (e.g., urea, etc.), or diesel oil. The reductant source 54 is in reductant supplying communication with the pump, which is structured to pump reductant from the reductant source 54 to the doser 56 via a reductant delivery line 58. The doser 56 may be positioned upstream of the SCR catalyst 50. The doser 56 is selectively controllable to inject reductant directly into the exhaust gas stream prior to entering the SCR catalyst 50. In some embodiments, the reductant may either be ammonia or DEF, which decomposes to produce ammonia. As briefly described above, the ammonia reacts with NOx in the presence of the SCR catalyst 50 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst 50 in the presence of $NH_3$.

The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst.

The AMOx catalyst 60 may be any of various flow-through catalysts structured to react with ammonia to produce mainly nitrogen. As briefly described above, the AMOx catalyst 60 is structured to remove ammonia that has slipped through or exited the SCR catalyst 50 without reacting with NOx in the exhaust. In certain instances, the exhaust aftertreatment system 22 may be operable with or without an AMOx catalyst. Further, although the AMOx catalyst 60 is shown as a separate unit from the SCR catalyst 50 in FIG. 1, in some implementations, the AMOx catalyst 60 may be integrated with the SCR catalyst 50, e.g., the AMOx catalyst 60 and the SCR catalyst 50 may be located within the same housing. According to the present disclosure, the SCR catalyst 50 and the AMOx catalyst 60 are positioned serially, with the SCR catalyst 50 preceding the AMOx catalyst 60. As described above, in various other embodiments, the AMOx catalyst 60 is not included in the exhaust aftertreatment system 22.

Referring still to FIG. 1, the exhaust aftertreatment system 22 may include various sensors, such as NOx sensors, oxygen sensors, temperature sensors, reductant sensors, pressure sensors, flow rate sensors, and so on. The various sensors may be strategically disposed throughout the exhaust aftertreatment system 22 and may be in communication with the controller 150 to monitor operating conditions of the exhaust aftertreatment system 22 and/or the engine 20. As shown in FIG. 1, the exhaust aftertreatment system 22 includes a first sensor, shown as first sensor 70, and a second sensor, shown as second sensor 80. According to an example embodiment, the second sensor 80 is positioned downstream of the first sensor 70. According to the example embodiment shown in FIG. 1, the first sensor 70 is positioned along the inlet piping 24 of the exhaust piping of the exhaust aftertreatment system 22. According to an example embodiment, the first sensor 70 is structured to acquire first oxygen data indicative of an amount of oxygen within the exhaust gas at the entrance of the exhaust aftertreatment system 22 (e.g., exiting the engine 20 and entering into the exhaust aftertreatment system 22 through the inlet piping 24, etc.). In other embodiments, the first sensor 70 is otherwise positioned to acquire the first oxygen data at another location along the exhaust aftertreatment system 22. For example, the first sensor 70 may be positioned downstream of the DOC 30, downstream of the DPF 40, downstream of the doser 56, downstream of the SCR catalyst 50, along the first section of exhaust piping 28A, along the second section of exhaust piping 28B, or along the third section of exhaust piping 28C, among other possible locations. In one embodiment, the first sensor 70 is or includes a NOx sensor. In other embodiments, the first sensor 70 is or includes an oxygen sensor (e.g., an $O_2$ sensor, a wide-band oxygen sensor, etc.). In still other embodiments, the first sensor 70 is or includes another sensor capable of acquiring oxygen data from the exhaust flow. In an alternative embodiment, the first sensor 70 is a virtual sensor.

According to the example embodiment shown in FIG. 1, the second sensor 80 is positioned along the outlet piping 26 of the exhaust piping of the exhaust aftertreatment system 22. According to an example embodiment, the second sensor 80 is structured to acquire second oxygen data indicative of an amount of oxygen within the exhaust gas exiting the exhaust aftertreatment system 22 into an ambient environment (e.g., an outside environment, an environment external to the engine system 10, etc.). In other embodiments, the second sensor 80 is otherwise positioned to acquire the second oxygen data at another location along the exhaust aftertreatment system 22. For example, the second sensor 80 may be positioned upstream of the DPF 40, upstream of the doser 56, upstream of the SCR catalyst 50, upstream of the AMOx catalyst 60, along the first section of exhaust piping 28A, along the second section of exhaust piping 28B, or along the third section of exhaust piping 28C, among other possible locations. In one embodiment, the second sensor 80 is or includes a NOx sensor. In other embodiments, the second sensor 80 is or includes an oxygen sensor (e.g., an $O_2$ sensor, a wide-band oxygen sensor, etc.). In still other embodiments, the second sensor 80 is or includes another sensor capable of acquiring oxygen data from the exhaust flow. In an alternative embodiment, the second sensor 80 is a virtual sensor. According to one embodiment, both the first sensor 70 and the second sensor 80 are NOx sensors. According to other embodiments, one of the first sensor 70 and the second sensor 80 is a NOx sensor and the other is an oxygen sensor or other sensor capable of measuring oxygen data in an exhaust flow.

In some embodiments, the exhaust aftertreatment system 22 the exhaust aftertreatment system 22 includes a third sensor, shown as third sensor 100. According to the example embodiment, the third sensor 100 is positioned downstream of the first sensor 70 and upstream of the second sensor 80 (e.g., positioned between the first sensor 70 and the second sensor 80, etc.). In other embodiments, the third sensor 100 is positioned upstream of the first sensor 70 or downstream of the second sensor 80. According to the example embodiment shown in FIG. 1, the third sensor 100 is positioned along the second section of exhaust piping 28B of the exhaust piping of the exhaust aftertreatment system 22. In other embodiments, the third sensor 100 is otherwise positioned. For example, the third sensor 100 may be positioned along the first section of exhaust piping 28A, along the second section of exhaust piping 28B, or along the third section of exhaust piping 28C, along the inlet piping 24, or along the outlet piping 26, among other possible locations. According to an example embodiment, the third sensor 100 is structured to acquire third oxygen data indicative of an amount of oxygen within the exhaust gas at a third location along the exhaust aftertreatment system 22 (e.g., a location different than the first sensor 70 and the second sensor 80, etc.). In one embodiment, the third sensor 100 is or includes a NOx sensor. In other embodiments, the third sensor 100 is or includes an oxygen sensor (e.g., an $O_2$ sensor, a wide-band oxygen sensor, etc.). In still other embodiments, the third sensor 100 is or includes another sensor capable of acquiring oxygen data from the exhaust flow. In an alternative embodiment, the third sensor 100 is a virtual sensor. In some embodiments, the exhaust aftertreatment system 22 includes additional sensors positioned to acquire oxygen data at alternative or additional locations along the exhaust aftertreatment system 22.

In other embodiments, a virtual NOx sensor, a virtual oxygen sensor, or any other virtual sensor is used instead of a physical sensor at the locations shown in FIG. 1 and/or described above. While FIG. 1 depicts several sensors (e.g., first sensor 70, second sensor 80, third sensor 100, etc.), it should be understood that one or more of these sensors may be replaced by virtual sensor in other embodiments. In this regard, the oxygen amount at various locations may be estimated, determined, or otherwise correlated with various operating conditions of the engine 20 and exhaust aftertreatment system 22. For example, based the operating conditions of the engine 20, an indicative amount of oxygen exiting the engine 20 may be determined. The determination may utilize a look-up table that correlates various operating conditions with expected oxygen amounts, which can be based on data determined during testing. The determination may also utilize any of a model, formula, equation, process, and the like to otherwise determine an oxygen amount at a various location without the use of a physical sensor. This embodiment may be beneficial in exhaust aftertreatment system architectures that are positioned in rather tight spaces, such that the electrical circuitry otherwise used to power and establish a communication protocol with the physical sensors may be eliminated. Further, this embodiment may be beneficial from the standpoint that the need to replace faulty sensors may be substantially avoided. In turn, an operator may realize a rather higher uptime for the system than downtime (e.g., in a repair shop, etc.).

In some embodiments, the engine system 10 includes a virtual sensor, shown as virtual sensor 90. According to an example embodiment, the virtual sensor 90 is structured to estimate third oxygen data indicative of an estimated amount of oxygen within the exhaust gas entering the exhaust aftertreatment system 22 from the engine 20. The virtual sensor 90 is structured to estimate the third oxygen data based on engine operation data indicative of operating conditions of the engine 20. The operating conditions of the engine 20 may include air intake flow rate, fuel flow rate, air-to-fuel ratio, ignition timing, injection timing, exhaust temperature, exhaust pressure, combustion/cylinder temperature, engine speed, engine power, cylinder pressure, and/or other engine operating characteristics. In other embodiments, the virtual sensor 90 is structured to estimate the third oxygen data at another location along the exhaust aftertreatment system 22. For example, the virtual sensor 90 may be structured to estimate the third oxygen data along the first section of exhaust piping 28A, along the second section of exhaust piping 28B, along the third section of exhaust piping 28C, along the inlet piping 24, or along the outlet piping 26, among other possible locations.

In some embodiments, the engine system 10 includes temperature sensors, reductant sensors, and/or particulate matter sensors, among other possible sensors. For example, one or more temperature sensors may be included within the engine system 10. The temperature sensor(s) may be structured to acquire temperature data at different sections of the exhaust piping of the exhaust aftertreatment system 22. By way of example, the temperature sensor(s) may be strategically positioned before and/or after any component within the engine system 10 (e.g., the engine 20, the DOC 30, the DPF 40, the SCR catalyst 50, the AMOx catalyst 60, etc.) such that the temperature of the exhaust gas flowing into and out of any component may be detected and communicably transmitted to the controller 150. In another example, one or more reductant sensors may be included along the exhaust piping of the exhaust aftertreatment system 22, downstream of the doser 56. The reductant sensor(s) may be structured to acquire reductant data indicative of an amount of reductant within the exhaust gas (e.g., upstream of the SCR catalyst 50, downstream of the SCR catalyst 50, downstream of the AMOx catalyst 60, etc.). By way of example, the reductant sensor(s) may be strategically positioned before and/or after any component within the engine system 10 (e.g., the doser 56, the SCR catalyst 50, the AMOx catalyst 60, etc.) such that the amount of reductant within the exhaust gas flowing into and out of any component may be detected and communicably transmitted to the controller 150. In yet another example, one or more particulate matter (PM) sensors may be included along the exhaust piping of the exhaust aftertreatment system 22. The PM sensor(s) may be structured to acquire data indicative of an amount of particulate matter flowing through the exhaust aftertreatment system 22. The PM sensors may be strategically positioned before and/or after any component within the exhaust aftertreatment system 22 such that the particulate matter of the exhaust gas flowing into and out of any component may be detected and communicably transmitted to the controller 150.

In some embodiments, the engine 20 includes various sensors structured to acquire the engine operation data. The various sensors of the engine 20 may be in communication with the controller 150 such that the controller 150 may monitor the operating conditions of the engine 20 indicated by the engine operation data. By way of example, the engine 20 may include a speed sensor, an oxygen sensor, a torque sensor, temperature sensor(s), pressure sensor(s), and/or flow sensor(s) structured to acquire the engine operation data indicative of the operating conditions of the engine 20 (e.g., air intake flow rate, fuel flow rate, air-to-fuel ratio, ignition timing, injection timing, exhaust temperature, exhaust pressure, combustion/cylinder temperature, engine speed, engine power, cylinder pressure, etc.) of the engine 20 and the exhaust exiting the engine 20.

FIG. 1 is also shown to include an operator input/output (I/O) device 120. The operator I/O device 120 is communicably coupled to the controller 150, such that information may be exchanged between the controller 150 and the operator I/O device 120, wherein the information may relate to one or more components of FIG. 1 or determinations (described below) of the controller 150. The operator I/O device 120 enables an operator of the engine system 10 to communicate with the controller 150 and one or more components of the engine system 10 of FIG. 1. For example, the operator I/O device 120 may include, but is not limited to, an interactive display, a touchscreen device, one or more buttons and switches, voice command receivers, etc. In various alternate embodiments, the controller 150 and components described herein may be implemented with non-vehicular applications (e.g., a power generator, etc.). Accordingly, the operator I/O device 120 may be specific to those applications. For example, in those instances, the operator I/O device 120 may include a laptop computer, a tablet computer, a desktop computer, a phone, a watch, a personal digital assistant, etc. Via the operator I/O device 120, the controller 150 may provide a fault or service notification based on a determined state (e.g., faulty, operational, etc.) of the first sensor 70, the second sensor 80, and/or the third sensor 100.

The controller 150 is structured to control the operation of the engine system 10 and associated sub-systems, such as the internal combustion engine 20 and the exhaust aftertreatment system 22. According to one embodiment, the components of FIG. 1 are embodied in a vehicle. The vehicle may include an on-road or an off-road vehicle including, but not limited to, line-haul trucks, mid-range trucks (e.g., pick-up trucks), cars, boats, tanks, airplanes, and any other type of vehicle that utilizes an exhaust aftertreatment system. In various alternate embodiments, as described above, the controller 150 may be used with any engine-exhaust aftertreatment system (e.g., a stationary power generation system, etc.). Communication between and among the components of the engine system 10 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, Zigbee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Because the controller 150 is communicably coupled to the systems and components of FIG. 1, the controller 150 is structured to receive data from one or more of the components shown in FIG. 1. For example, the data may include the first oxygen data (e.g., acquired by the first sensor 70, etc.), the second oxygen data (e.g., acquired by the second sensor 80, etc.), the third oxygen data (e.g., estimated by the virtual sensor 90, acquired by the third sensor 100, etc.), and/or engine operation data (e.g., acquired by one or more engine sensors, etc.). As another example, the data may include an input from operator I/O device 120. The structure and function of the controller 150 is further described in regard to FIG. 2.

As the components of FIG. 1 are shown to be embodied in an engine system 10, in one embodiment the controller 150 may be embodied as an electronic control unit (ECU) or an add-on to an ECU. In some embodiments, the controller 150 may be a stand-alone tool that performs all required data logging, data tracking, data analysis, etc. needed to diagnose faults of the sensors of the engine system 10. In some embodiments, the controller 150 is included in the ECU of a vehicle. The ECU may include a transmission control unit and any other vehicle control unit (e.g., exhaust aftertreatment control unit, powertrain control circuit, engine control circuit, etc.). In an alternative embodiment, the controller 150 is web based, server based, and/or application based (e.g., a smartphone app, a controller on the internet, etc.). The structure and function of the controller 150 is further described in regard to FIG. 2.

Figure 2:
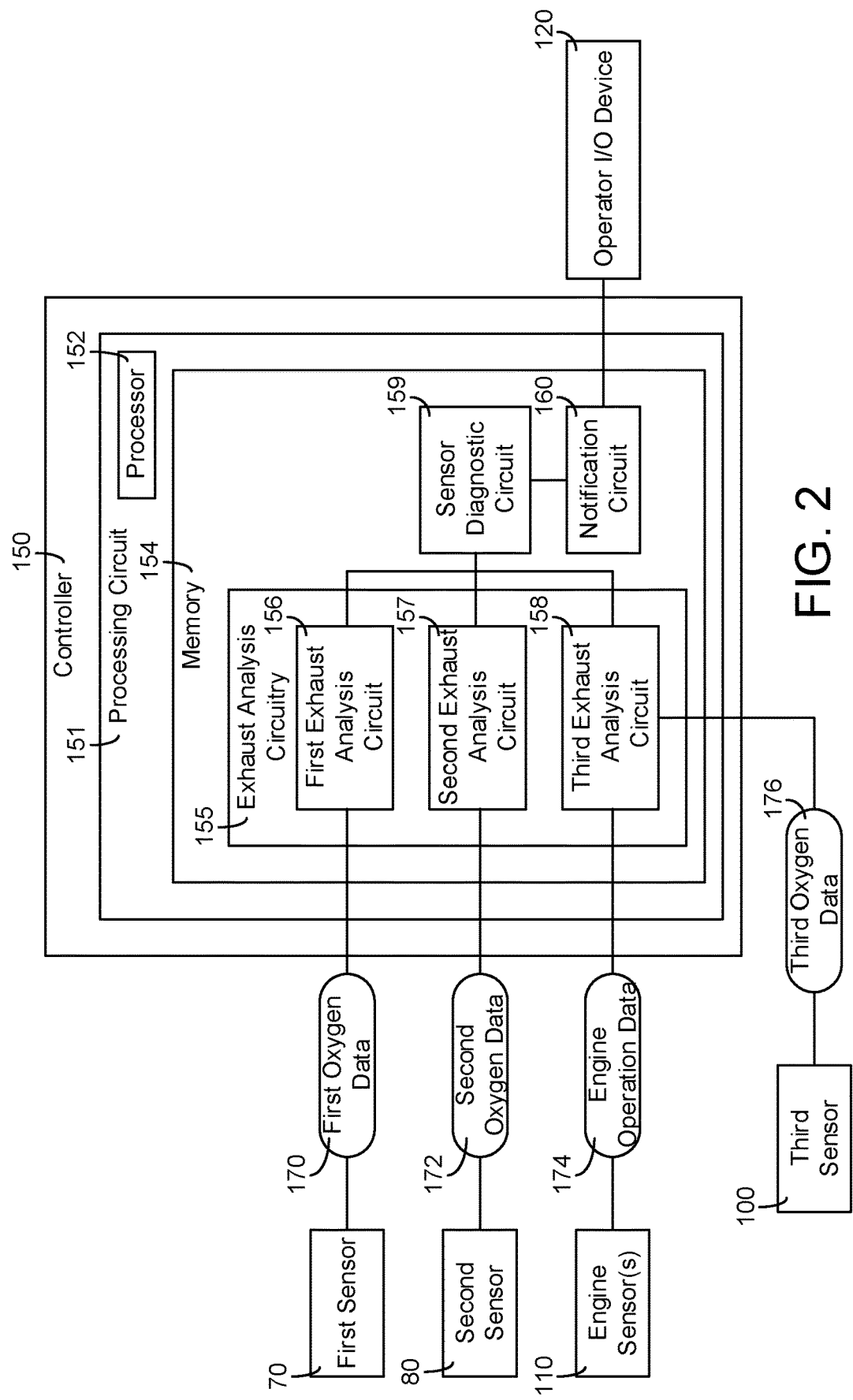
FIG. 2 is a schematic diagram of the controller used with the system of FIG. 1, according to an example embodiment.

As such, referring now to FIG. 2, an example structure for the controller 150 is shown according to one embodiment. As shown, the controller 150 includes a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various circuits for completing the activities described herein. More particularly, the memory 154 includes exhaust analysis circuitry 155, a sensor diagnostic circuit 159, and a notification circuit 160, wherein the circuits may be structured to interpret oxygen data to diagnose in-range rationality of NOx sensors (e.g., the first sensor 70, the second sensor 80, the third sensor 100, etc.). While various circuits with particular functionality are shown in FIG. 2, it should be understood that the controller 150 and memory 154 may include any number of circuits for completing the functions described herein. For example, the activities of multiple circuits may be combined as a single circuit, additional circuits with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 2, the exhaust analysis circuitry 155 includes a first exhaust analysis circuit 156, a second exhaust analysis circuit 157, and a third exhaust analysis circuit 158. The first exhaust analysis circuit 156 may include or be operatively and communicably coupled to the first sensor 70 for receiving first oxygen data 170. The first exhaust analysis circuit 156 may be structured to receive and interpret the first oxygen data 170 acquired by the first sensor 70. For example, the first sensor 70 may include a wide-band oxygen sensor that measures the ratio of oxygen to fuel vapor in the exhaust exiting the engine 20. The measured ratio may be expressed as parts of oxygen to fuel. The first exhaust analysis circuit 156 may interpret (e.g., manipulate, rationalize, analyze, etc.) the oxygen to fuel vapor ratio to determine the parts-per-million (ppm) of oxygen within the exhaust. By way of another example, the first sensor 70 may include an oxygen sensor or other sensor (e.g., NOx sensor) that measures ppm of oxygen in the exhaust. As described above, the first oxygen data 170 is indicative of a first amount of oxygen in the exhaust flow at a first location along the exhaust aftertreatment system 22 (e.g., the inlet of the exhaust aftertreatment system 22, etc.). The first exhaust analysis circuit 156 may be further structured to store the first oxygen data 170 for future use by other circuits (e.g., the sensor diagnostic circuit 159, etc.).

According to one embodiment, the first exhaust analysis circuit 156 may include communication circuitry structured to facilitate the exchange of information, data, values, non-transient signals, etc. between and among the first exhaust analysis circuit 156, the first sensor 70, and the sensor diagnostic circuit 159. For example, the communication circuitry may include a channel comprising any type of communication channel (e.g., fiber optics, wired, wireless, etc.), wherein the channel may include any additional component for signal enhancement, modulation, demodulation, filtering, and the like.

In this regard, the first exhaust analysis circuit 156 may include communication circuitry including, but not limited to, wired and wireless communication protocol to facilitate reception of the first oxygen data 170. In another embodiment, the first exhaust analysis circuit 156 may include machine-readable media stored by the memory 154 and executable by the processor 152, wherein the machine-readable media facilitates performance of certain operations to receive the first oxygen data 170. For example, the machine-readable media may provide an instruction (e.g., command, etc.) to the first sensor 70 operatively coupled to the exhaust aftertreatment system 22 to monitor and acquire the first oxygen data 170. In this regard, the machine-readable media may include programmable logic that defines the frequency of acquisition of the first oxygen data 170. In yet another embodiment, the first exhaust analysis circuit 156 may include any combination of machine-readable content, communication circuitry, and the first sensor 70.

The second exhaust analysis circuit 157 may include or be operatively and communicably coupled to the second sensor 80 for receiving second oxygen data 172. The second exhaust analysis circuit 157 may be structured to receive and interpret the second oxygen data 172 acquired by the second sensor 80. For example, the second sensor 80 may include a wide-band oxygen sensor that measures the ratio of oxygen to fuel vapor in the exhaust exiting the engine 20. The measured ratio may be expressed as parts of oxygen to fuel. The second exhaust analysis circuit 157 may interpret (e.g., manipulate, rationalize, analyze, etc.) the oxygen to fuel vapor ratio to determine the parts-per-million (ppm) of oxygen within the exhaust. By way of another example, the second sensor 80 may include an oxygen sensor or other sensor (e.g., NOx sensor) that measures ppm of oxygen in the exhaust. As described above, the second oxygen data 172 is indicative of a second amount of oxygen in the exhaust flow at a second location along the exhaust aftertreatment system 22 (e.g., the outlet of the exhaust aftertreatment system 22, etc.). The second exhaust analysis circuit 157 may be further structured to store the second oxygen data 172 for future use by other circuits (e.g., the sensor diagnostic circuit 159, etc.). The second exhaust analysis circuit 157 may include communication circuitry structured to facilitate the exchange of information, data, values, non-transient signals, etc. between and among the second exhaust analysis circuit 157, the second sensor 80, and the sensor diagnostic circuit 159. For example, the communication circuitry may include a channel comprising any type of communication channel (e.g., fiber optics, wired, wireless, etc.), wherein the channel may include any additional component for signal enhancement, modulation, demodulation, filtering, and the like.

In this regard, the second exhaust analysis circuit 157 may include communication circuitry including, but not limited to, wired and wireless communication protocol to facilitate reception of the second oxygen data 172. In still another embodiment, the second exhaust analysis circuit 157 may include machine-readable media stored by the memory 154 and executable by the processor 152, wherein the machine-readable media facilitates performance of certain operations to receive the second oxygen data 172. For example, the machine-readable media may provide an instruction (e.g., command, etc.) to the second sensor 80 operatively coupled to the exhaust aftertreatment system 22 to monitor and acquire the second oxygen data 172. In this regard, the machine-readable media may include programmable logic that defines the frequency of acquisition of the second oxygen data 172. In yet another embodiment, the second exhaust analysis circuit 157 may include any combination of machine-readable content, communication circuitry, and the second sensor 80.

In some embodiments, the third exhaust analysis circuit 158 may include or be operatively and communicably coupled to the third sensor 100 for receiving third oxygen data 176. The third exhaust analysis circuit 158 may be structured to receive and interpret the third oxygen data 176 acquired by the third sensor 100. For example, the third sensor 1000 may include a wide-band oxygen sensor that measures the ratio of oxygen to fuel vapor in the exhaust exiting the engine 20. The measured ratio may be expressed as parts of oxygen to fuel. The third exhaust analysis circuit 158 may interpret (e.g., manipulate, rationalize, analyze, etc.) the oxygen to fuel vapor ratio to determine the parts-per-million (ppm) of oxygen within the exhaust. By way of another example, the third sensor 100 may include an oxygen sensor or other sensor (e.g., NOx sensor) that measures ppm of oxygen in the exhaust. As described above, the third oxygen data 176 is indicative of a third amount of oxygen in the exhaust flow at a third location along the exhaust aftertreatment system 22 (e.g., between the first sensor 70 and the second sensor 80, upstream of the first sensor 70, downstream of the second sensor 80, etc.). The third exhaust analysis circuit 158 may be further structured to store the third oxygen data 176 for future use by other circuits (e.g., the sensor diagnostic circuit 159, etc.). The third exhaust analysis circuit 158 may include communication circuitry structured to facilitate the exchange of information, data, values, non-transient signals, etc. between and among the third exhaust analysis circuit 158, the third sensor 100, and the sensor diagnostic circuit 159. For example, the communication circuitry may include a channel comprising any type of communication channel (e.g., fiber optics, wired, wireless, etc.), wherein the channel may include any additional component for signal enhancement, modulation, demodulation, filtering, and the like.

In this regard, the third exhaust analysis circuit 158 may include communication circuitry including, but not limited to, wired and wireless communication protocol to facilitate reception of the third oxygen data 176. In still another embodiment, the third exhaust analysis circuit 158 may include machine-readable media stored by the memory 154 and executable by the processor 152, wherein the machine-readable media facilitates performance of certain operations to receive the third oxygen data 176. For example, the machine-readable media may provide an instruction (e.g., command, etc.) to the third sensor 100 operatively coupled to the exhaust aftertreatment system 22 to monitor and acquire the third oxygen data 176. In this regard, the machine-readable media may include programmable logic that defines the frequency of acquisition of the third oxygen data 176. In yet another embodiment, the third exhaust analysis circuit 158 may include any combination of machine-readable content, communication circuitry, and the third sensor 100.

In other embodiments, the third exhaust analysis circuit 158 is structured as a virtual oxygen sensor, such as the virtual sensor 90. The third exhaust analysis circuit 158 may be structured to additionally or alternatively estimate the third oxygen data 176 indicative of an estimated amount of oxygen in the exhaust flow entering the exhaust aftertreatment system 22 from the engine 20. The third exhaust analysis circuit 158 may be structured to determine the third oxygen data 176 based on engine operation data 174. The engine operation data 174 may be acquired and transmitted to the third exhaust analysis circuit 158 by one or more engine sensors 110. The third exhaust analysis circuit 158 may include or be operatively and communicably coupled to the one or more engine sensors 110. According to an alternate embodiment, the third exhaust analysis circuit 158 may include the engine 20 itself and any ancillary components thereof (e.g., sensors, air intake systems, fueling systems, etc.), such that the third exhaust analysis circuit 158 may monitor, store, and analyze data, values, signals, and generally operation of the engine 20.

Thus, the third exhaust analysis circuit 158 may include communication circuitry structured to facilitate the exchange of information, data, values, non-transient signals, etc. between and among the third exhaust analysis circuit 158 and the one or more engine sensors 110. As described above, the engine operation data 174 may include operating conditions of the engine 20 such as air intake flow rate, fuel flow rate, air-to-fuel ratio, ignition timing, injection timing, exhaust temperature, exhaust pressure, combustion/cylinder temperature, engine speed, engine power, cylinder pressure, and/or other engine operating characteristics that provide an indication to the amount of oxygen exiting the engine 20 into the exhaust aftertreatment system 22.

In this regard, the third exhaust analysis circuit 158 may include communication circuitry including, but not limited to, wired and wireless communication protocol to facilitate reception of the engine operation data 174. In still another embodiment, the third exhaust analysis circuit 158 may include machine-readable media stored by the memory 154 and executable by the processor 152, wherein the machine-readable media facilitates performance of certain operations to receive the engine operation data 174. For example, the machine-readable media may provide an instruction (e.g., command, etc.) to the one or more engine sensors 110 operatively coupled to the engine 20 to monitor and acquire the engine operation data 174. In this regard, the machine-readable media may include programmable logic that defines the frequency of acquisition of the engine operation data 174. In yet another embodiment, the third exhaust analysis circuit 158 may include any combination of machine-readable content, communication circuitry, and the one or more engine sensors 110.

According to one embodiment, the oxygen entering the exhaust aftertreatment system 22 is measured by an oxygen sensor and/or a NOx sensor (e.g., the first sensor 70, etc.) positioned at the exhaust output (e.g., an exhaust manifold, etc.) of the engine 20. According to another embodiment, the oxygen entering the exhaust aftertreatment system 22 is estimated by the controller 150 using the engine operation data 174. For example, based on an air intake rate (e.g., weight/unit time), an engine speed, power output, etc., the controller 150 may determine (e.g., back calculate, etc.) combustion conditions. Based on the determined combustion conditions relative to stoichiometry, the controller 150 may estimate the amount of oxygen used for combustion and whether there is any excess, which may be approximated with or without a weighting factor to account for operating conditions (e.g., accumulation of oxygen within the cylinder, etc.) to represent the value of oxygen entering the exhaust aftertreatment system 22.

According to still another embodiment, the oxygen entering the exhaust aftertreatment system 22 may be based on the fuel injection characteristic in combination with the air intake. In this regard, the controller 150 may determine the amount of oxygen needed for combustion based on the fuel injection amount and then determine an approximate amount of oxygen entering the exhaust aftertreatment system 22 similar to described above in the previous example. In still another embodiment, the oxygen entering the exhaust aftertreatment system 22 may be determined based on fueling/combustion tables included with the controller 150, wherein the fueling/combustion tables provide chemical indications of combustion conditions at certain operating conditions, such that an approximation of the engine out oxygen amount may be made.

According to an example embodiment, the third exhaust analysis circuit 158 is structured to determine (e.g., estimate, calculate, etc.) the amount of oxygen in the exhaust flow entering the exhaust aftertreatment system 22 from the engine 20 based on the following equation:

$$O_{2_{exhaust}} = O_{2_{charge\ flow}} - O_{2_{consumed}} \quad (1)$$

where $O_{2_{exhaust}}$ is the amount of oxygen in the exhaust flow entering the exhaust aftertreatment system 22 from the engine 20, $O_{2_{charge\ flow}}$ is the amount of oxygen from the charge flow (e.g., air intake, etc.) entering the engine 20, and $O_{2_{consumed}}$ is the amount of oxygen consumed during combustion. According to an example embodiment $O_{2_{charge\ flow}}$ is a function of fresh air flow (e.g., air coming into the engine from an outside environment via an air intake, etc.). Fresh air flow may be measured directly from a sensor (e.g., a mass airflow (MAF) sensor, etc.) and/or determined by subtracting a measured exhaust gas recirculation (EGR) flow from an estimated charge flow. According to an example embodiment $O_{2_{consumed}}$ is a function of fueling. For example, for every mole of fuel injected into the engine 20 for combustion, approximately 14.5 moles of oxygen are consumed. In yet another embodiment, any combination of the above may be use and any other formulation or determination process used by those of ordinary skill in the art.

The sensor diagnostic circuit 159 may be structured to determine at least one of the first sensor 70 and the second sensor 80 are faulty based on the first amount of oxygen in the exhaust flow at the first location and the second amount of oxygen in the exhaust flow at the second location differing more than a first threshold value. The first threshold value may be a magnitude difference, a percentage difference, or the like between the first amount of oxygen and the second amount of oxygen. The first threshold value may be predefined within the sensor diagnostic circuit 159 or entered by an operator via the operator I/O device 120. According to an example embodiment, the amount of oxygen within the exhaust aftertreatment system 22 remains substantially constant as the hydrocarbons and NOx are converted into less harmful emission constituents. Thus, if the first amount of oxygen and the second amount of oxygen differ (e.g., by more than the first threshold value, etc.), at least one of the first sensor 70 and the second sensor 80 may be faulty.

In one embodiment, the sensor diagnostic circuit 159 is structured to determine which of the first sensor 70 and the second sensor 80 are faulty based on the first amount of oxygen (e.g., indicated by the first oxygen data 170, etc.), the second amount of oxygen (e.g., indicated by the second oxygen data 172, etc.), and/or the estimated amount of oxygen (e.g., indicated by the engine operation data 174, etc.). The sensor diagnostic circuit 159 may be structured to determine the first sensor 70 is faulty based on the first amount of oxygen and the estimated amount of oxygen differing more than a second threshold value. The second threshold value may be a magnitude difference, a percentage difference, or the like between the first amount of oxygen and the estimated amount of oxygen. The second threshold value may be predefined within the sensor diagnostic circuit 159 or entered by an operator via the operator I/O device 120. In one embodiment, the second threshold value is different than the first threshold value. In other embodiments, the second threshold value is the same or substantially the same as the first threshold value.

The sensor diagnostic circuit 159 may be structured to determine the second sensor 80 is faulty based on the second amount of oxygen and the estimated amount of oxygen differing more than a third threshold value. The third threshold value may be a magnitude difference, a percentage difference, or the like between the second amount of oxygen and the estimated amount of oxygen. The third threshold value may be predefined within the sensor diagnostic circuit 159 or entered by an operator via the operator I/O device 120. In one embodiment, the third threshold value is different than the first threshold value and the second threshold value. In other embodiments, the third threshold value is the same or substantially the same as the first threshold value and/or the second threshold value. For example, the second sensor 80 may be reading an oxygen content of 120 ppm, while the estimated oxygen content is 100 ppm. Thus, the sensor diagnostic circuit 159 may determine that the second sensor 80 is faulty. The same may be performed by the sensor diagnostic circuit 159 to diagnose the first sensor 70.

In another embodiment, the sensor diagnostic circuit 159 is structured to determine which of the first sensor 70, the second sensor 80, and the third sensor 100 are faulty based on the first amount of oxygen (e.g., indicated by the first oxygen data 170, etc.), the second amount of oxygen (e.g., indicated by the second oxygen data 172, etc.), and/or the third amount of oxygen (e.g., indicated by the third oxygen data 176, etc.). The sensor diagnostic circuit 159 may be structured to determine one of the first sensor 70, the second sensor 80, and the third sensor 100 is faulty based on one of the first amount of oxygen, the second amount of oxygen, and the third amount of oxygen not agreeing with the other two of the first amount of oxygen, the second amount of oxygen, and the third amount of oxygen. For example, the second sensor 80 and the third sensor 100 may be reading a first amount of oxygen (e.g., 100 ppm, etc.) and the first sensor 70 may be reading a different second amount of oxygen (e.g., 120 ppm, etc.). Thus, the sensor diagnostic circuit 159 may determine that the first sensor 70 is faulty.

Based on the foregoing, the sensor diagnostic circuit 159 may include communication circuitry including, but not limited to, wired and wireless communication protocol to facilitate receiving the first oxygen data 170, the second oxygen data 172, the engine operation data 174, and/or the third oxygen data 176. In another embodiment, the sensor diagnostic circuit 159 may include machine-readable media stored by the memory 154 and executable by the processor 152, wherein the machine-readable media facilitates performance of certain operations to interpret the data to determine whether one or more sensors (e.g., the first sensor 70, the second sensor 80, the third sensor 100, etc.) are faulty. In yet another embodiment, the sensor diagnostic circuit 159 may include any combination of machine-readable content and communication circuitry.

The notification circuit 160 may be structured to provide one or more notifications (e.g., fault codes, etc.). The notifications may correspond with a fault code, a notification (e.g., on the operator I/O device 120), and the like. The notification indicates whether the first sensor 70, the second sensor 80, and/or the third sensor 100 are potentially faulty such that an operator may take appropriate actions (e.g., schedule an appointment for service, replace the failed sensor, etc.) to address the sensor fault notification. In one embodiment, the notification circuit 160 may include or be communicably coupled with the operator I/O device 120. In another embodiment, the notification circuit 160 may include communication circuitry including, but not limited to, wired and wireless communication protocol to facilitate receiving the determinations made by the sensor diagnostic circuit 159 and providing the notification to the operator I/O device 120. In still another embodiment, the notification circuit 160 may include machine-readable media stored by the memory 154 and executable by the processor 152, wherein the machine-readable media facilitates performance of certain operations to provide the notification to the operator I/O device 120. For example, the machine-readable media may provide an instruction (e.g., command, etc.) to the operator I/O device 120 to provide the notification. In yet another embodiment, the notification circuit 160 may include any combination of machine-readable content, communication circuitry, and the operator I/O device 120.

In some embodiments, the notification may include a report indicative of the conditions of the result (e.g., engine speed, vehicle speed, power output, grade information, etc.). In this regard, an operator may analyze the report relative to other similarly situated reports to make a final determination of the test. In certain embodiments, if the oxygen amount measured by a sensor exceeds the respective threshold, the controller 150 may deactivate the faulty sensor, such that measurements, readings, or estimations by that sensor are excluded from the operations of the controller 150. Beneficially, such an action may prevent mis-diagnosis or incorrect determinations regarding one or more other components in the exhaust aftertreatment system 22. In still another embodiment, the notification circuit 160 may be communicably coupled to a remote monitor (e.g., via a telematics unit and system, etc.), where the controller 150 may provide the results of the diagnostic to the remote monitor. Beneficially, the remote monitor may aggregate the data from a plurality of vehicles to analyze trends. In yet another embodiment, a faulty determination may trigger an intrusive diagnostic test to confirm the results of the aforementioned process. The engine 20 may be forced to operate at certain operating conditions (e.g., in a test bay, etc.) to alter the amount of oxygen content within the exhaust flow such that the sensors may be monitored at various different operating conditions to verify whether one or more of the sensors are faulty. For example, the engine 20 may be controlled in a manner such that oxygen levels in the exhaust gas are increased. The response to the sensors (e.g., the first sensor 70, the second sensor 80, the third sensor 100, etc.) may be monitored, and which ever sensor does not respond accordingly is most likely faulty. The intrusive diagnostics method may be used additionally (e.g., as a supplemental verification process, etc.) or alternatively (e.g., as the sole diagnostic process, etc.) to the aforementioned processes performed by the various circuits of the controller 150.

Figure 3:
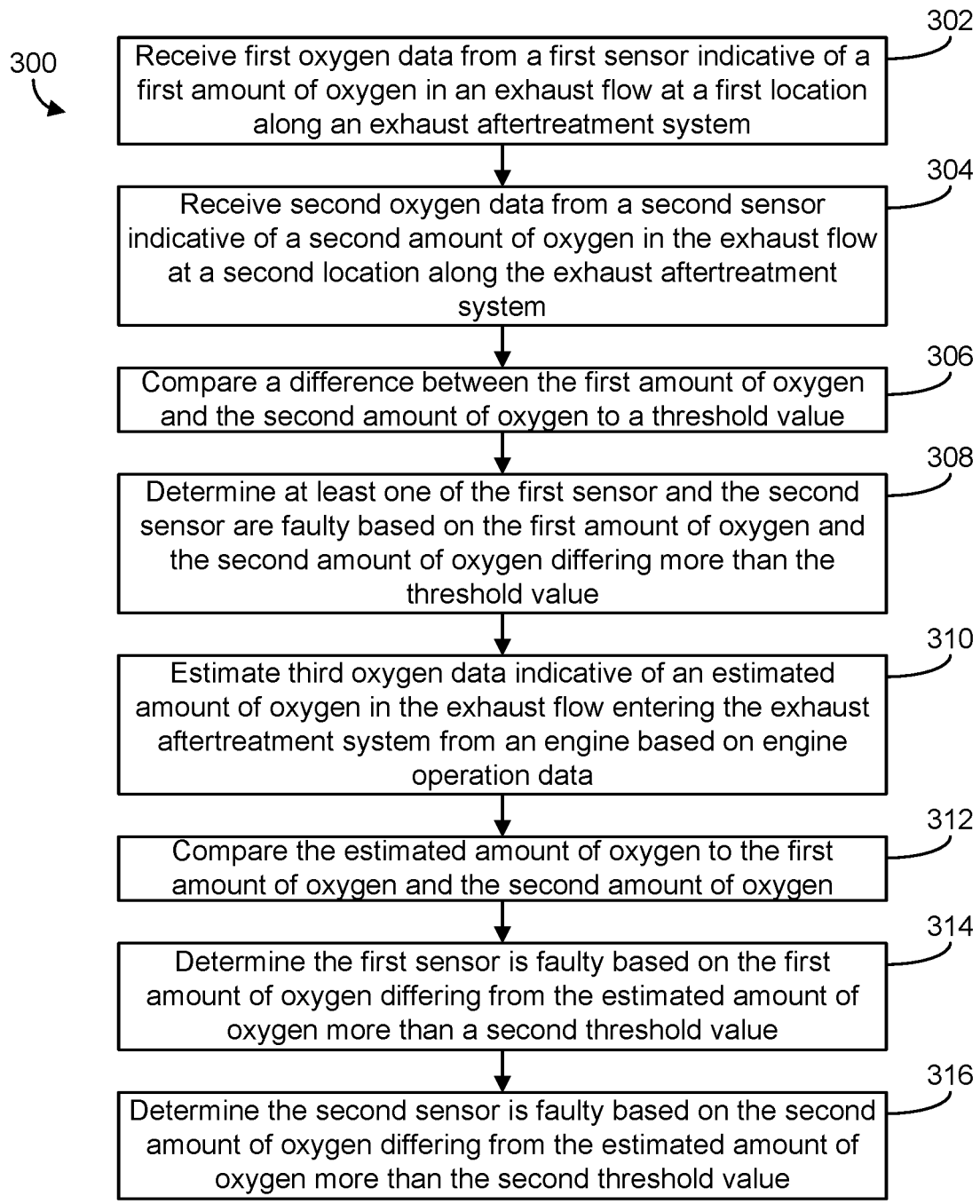
FIG. 3 is a flow diagram of a method for diagnosing in-range rationality of NOx sensors, according to an example embodiment.

Referring now to FIG. 3, a method 300 for diagnosing in-range rationality of NOx sensors is shown according to an example embodiment. In one example embodiment, method 300 may be implemented with the controller 150 of FIGS. 1-2. Accordingly, method 300 may be described in regard to FIGS. 1-2.

At process 302, the controller 150 is structured to receive first oxygen data (e.g., the first oxygen data 170, etc.) from a first sensor (e.g., the first sensor 70, etc.) indicative of a first amount of oxygen in an exhaust flow at a first location along an exhaust aftertreatment system (e.g., the exhaust aftertreatment system 22, etc.). In one embodiment, the first sensor is structured as or includes a NOx sensor. In another embodiment, the first sensor is structured as or includes an oxygen sensor. In one embodiment, the first location along the exhaust aftertreatment system is at an inlet or near an inlet of the exhaust aftertreatment system. In other embodiments, the first location along the exhaust aftertreatment system is at another location of the exhaust aftertreatment system (e.g., downstream of the DOC 30, the DPF 40, the DEF doser 56, the SCR catalyst 50, etc.).

At process 304, the controller 150 is structured to receive second oxygen data (e.g., the second oxygen data 172, etc.) from a second sensor (e.g., the second sensor 80, etc.) indicative of a second amount of oxygen in the exhaust flow at a second location along the exhaust aftertreatment system. In one embodiment, the second sensor is structured as or includes a NOx sensor. In another embodiment, the second sensor is structured as or includes an oxygen sensor. In one embodiment, the second location along the exhaust aftertreatment system is at an outlet or near an outlet of the exhaust aftertreatment system. In other embodiments, the second location along the exhaust aftertreatment system is at another location of the exhaust aftertreatment system (e.g., upstream of the DPF 40, the DEF doser 56, the SCR catalyst 50, the AMOx catalyst 60, etc.).

At process 306, the controller 150 is structured to compare a difference between the first amount of oxygen and the second amount of oxygen to a threshold value. The threshold value may be a magnitude differential, a percentage differential, or the like. At process 308, the controller 150 is structured to determine at least one of the first sensor and the second sensor are faulty based on the first amount of oxygen and the second amount of oxygen differing more than the threshold value.

At process 310, the controller 150 is structured to estimate third oxygen data (e.g., with a virtual sensor such as the virtual sensor 90, etc.) indicative of an estimated amount of oxygen in the exhaust flow entering the exhaust aftertreatment system from an engine (e.g., the engine 20, etc.) based on engine operation data (e.g., the engine operation data 174, etc.). As described above, the engine operation data (e.g., air-to-fuel ratio, fueling rate, exhaust flow rate, exhaust temperature, engine speed, ignition timing, etc.) may be used to estimate the amount of oxygen in the exhaust gas flow exiting the engine after a combustion process.

At process 312, the controller 150 is structured to compare the estimated amount of oxygen to the first amount of oxygen and the second amount of oxygen. At process 314, the controller 150 is structured to determine the first sensor is faulty based on the first amount of oxygen differing from the estimated amount of oxygen more than a second threshold value. In one embodiment, the first threshold and the second threshold are different. In some embodiments, the first threshold and the second threshold are the same. At process 316, the controller 150 is structured to determine the second sensor is faulty based on the second amount of oxygen differing from the estimated amount of oxygen more than the second threshold value. In other embodiments, the difference between the second amount of oxygen and the estimated amount of oxygen is compared to a third threshold value, which may be the different from the first threshold value and/or the second threshold value. The controller 150 may be further structured to provide an indication (e.g., an alert, a notification, a warning, etc.) to an operator of the engine system regarding the failure of the first sensor and/or the second sensor.

Figure 4:
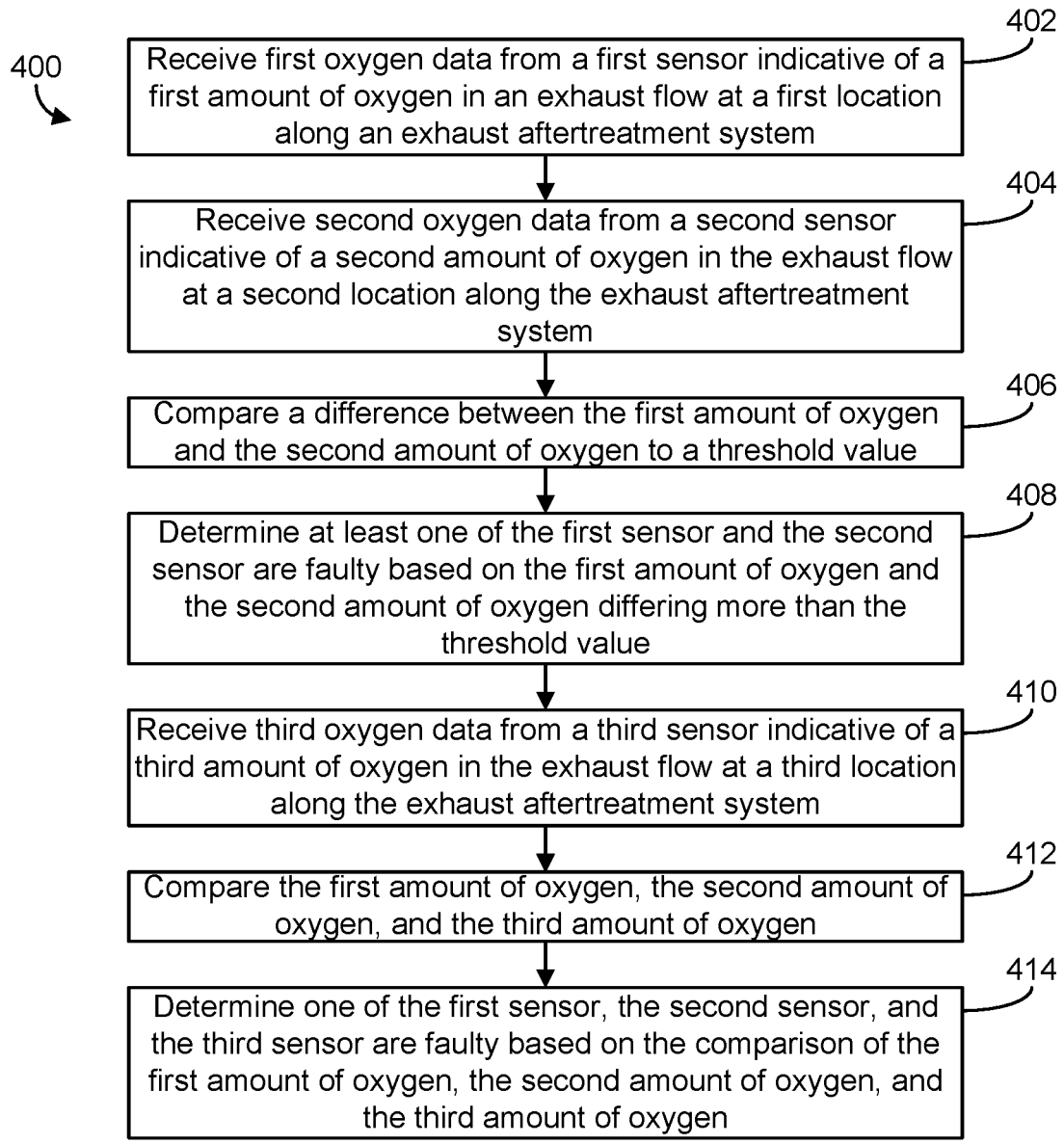
FIG. 4 is a flow diagram of a method for diagnosing in-range rationality of NOx sensors, according to another example embodiment.

Referring now to FIG. 4, a method 400 for diagnosing in-range rationality of NOx sensors is shown according to another example embodiment. In one example embodiment, method 400 may be implemented with the controller 150 of FIGS. 1-2. Accordingly, method 400 may be described in regard to FIGS. 1-2.

At process 402, the controller 150 is structured to receive first oxygen data (e.g., the first oxygen data 170, etc.) from a first sensor (e.g., the first sensor 70, etc.) indicative of a first amount of oxygen in an exhaust flow at a first location along an exhaust aftertreatment system (e.g., the exhaust aftertreatment system 22, etc.). In one embodiment, the first sensor is structured as or includes a NOx sensor. In another embodiment, the first sensor is structured as or includes an oxygen sensor. In one embodiment, the first location along the exhaust aftertreatment system is at an inlet or near an inlet of the exhaust aftertreatment system. In other embodiments, the first location along the exhaust aftertreatment system is at another location of the exhaust aftertreatment system (e.g., downstream of the DOC 30, the DPF 40, the DEF doser 56, the SCR catalyst 50, etc.).

At process 404, the controller 150 is structured to receive second oxygen data (e.g., the second oxygen data 172, etc.) from a second sensor (e.g., the second sensor 80, etc.) indicative of a second amount of oxygen in the exhaust flow at a second location along the exhaust aftertreatment system. In one embodiment, the second sensor is structured as or includes a NOx sensor. In another embodiment, the second sensor is structured as or includes an oxygen sensor. In one embodiment, the second location along the exhaust aftertreatment system is at an outlet or near an outlet of the exhaust aftertreatment system. In other embodiments, the second location along the exhaust aftertreatment system is at another location of the exhaust aftertreatment system (e.g., upstream of the DPF 40, the DEF doser 56, the SCR catalyst 50, the AMOx catalyst 60, etc.).

At process 406, the controller 150 is structured to compare a difference between the first amount of oxygen and the second amount of oxygen to a threshold value. The threshold value may be a magnitude differential, a percentage differential, or the like. At process 408, the controller 150 is structured to determine at least one of the first sensor and the second sensor are faulty based on the first amount of oxygen and the second amount of oxygen differing more than the threshold value.

At process 410, the controller 150 is structured to receive third oxygen data (e.g., the third oxygen data 176, etc.) from a third sensor (e.g., the third sensor 100, etc.) indicative of a third amount of oxygen in the exhaust flow at a third location along the exhaust aftertreatment system. In one embodiment, the third sensor is structured as or includes a NOx sensor. In another embodiment, the third sensor is structured as or includes an oxygen sensor. In an alternative embodiment, the third sensor is structured as a virtual sensor (e.g., the virtual sensor 90; see, e.g., method 300; etc.). In one embodiment, the third location along the exhaust aftertreatment system is between the first location and the second location (e.g., the third sensor is positioned between the first sensor and the second sensor, etc.). In other embodiments, the third location along the exhaust aftertreatment system is upstream of the first location or downstream of the second location (e.g., the third sensor is positioned outside of the first sensor and the second sensor, etc.).

At process 412, the controller 150 is structured to compare the first amount of oxygen, the second amount of oxygen, and the third amount of oxygen. At process 414, the controller 150 is structured to determine one of the first sensor, the second sensor, and the third sensor is faulty based on the comparison of the first amount of oxygen, the second amount of oxygen, and the third amount of oxygen. The controller 150 may determine that one of the first sensor, the second sensor, and the third sensor are faulty based on one of the first amount of oxygen, the second amount of oxygen, and the third amount of oxygen not agreeing with the other two of the first amount of oxygen, the second amount of oxygen, and the third amount of oxygen. For example, the first sensor may reading a different value that the second sensor and the third sensor. Thus, the controller 150 may determine that the first sensor is faulty. The controller 150 may be further structured to provide an indication (e.g., an alert, a notification, a warning, etc.) to an operator of the engine system regarding the failure of the first sensor and/or the second sensor.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 152 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller 150 of FIGS. 1-2), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A non-transitory computer readable medium having computer-executable instructions embodied therein that, when executed by a computing system, cause the computing system to perform operations comprising:
   interpreting first oxygen data acquired by a first nitrous oxide (NOx) sensor indicative of a first measurement of an amount of oxygen in an exhaust flow at a location in or proximate to an exhaust aftertreatment system, wherein the exhaust aftertreatment system is in exhaust gas receiving communication with an engine;
   estimating the amount of oxygen in the exhaust flow using engine operation data; and
   determining that the NOx sensor is faulty based on determining that a difference between the first measurement of the amount of oxygen and the estimated amount of oxygen is greater than a threshold value.

2. The computer readable medium of claim 1, wherein the engine operation data comprises at least one of an air intake flow rate, a fuel flow rate, an air-to-fuel ratio, an ignition timing, a fuel injection timing, a temperature of the exhaust flow, a pressure of the exhaust flow, a temperature of the engine, a pressure of a cylinder of the engine, a speed of the engine, or a power output of the engine.

3. The computer readable medium of claim 1, wherein the estimated amount of oxygen is determined based on a difference between an amount of oxygen in a charge flow and an amount of oxygen consumed during combustion.

4. The computer readable medium of claim 3, wherein the amount of oxygen in the charge flow is determined based on fresh air flow data from one or more sensors, and wherein the amount of oxygen consumed during combustion is determined based on an amount of fueling.

5. The computer readable medium of claim 1, wherein the first NOx sensor comprises an oxygen sensor.

6. The computer readable medium of claim 1, the operations further comprising:
   interpreting second oxygen data acquired by a second NOx sensor indicative of a second measurement of the amount of oxygen in the exhaust flow at a second location along the exhaust aftertreatment system; and
   interpreting third oxygen data acquired by a third NOx sensor indicative of a third measurement of the amount of oxygen in the exhaust flow at a third location along the exhaust aftertreatment system.

7. The computer readable medium of claim 6, the operations further comprising determining at least one of the first NOx sensor, the second NOx sensor, or the third NOx sensor is faulty based on one of the first measurement of the amount of oxygen, the second measurement of the amount of oxygen, or the third measurement of the amount of oxygen being different from the other two of the first measurement of the amount of oxygen, the second measurement of the amount of oxygen, and the third measurement of the amount of oxygen.

8. A method, comprising:
   interpreting first oxygen data acquired by a first nitrous oxide (NOx) sensor indicative of a first measurement of an amount of oxygen in an exhaust flow at a location in or proximate to an exhaust aftertreatment system, wherein the exhaust aftertreatment system is in exhaust gas receiving communication with an engine;
   estimating the amount of oxygen in the exhaust flow entering the exhaust aftertreatment system from the engine using engine operation data; and
   determining that the NOx sensor is faulty based on determining that a difference between the first measurement of the amount of oxygen and the estimated amount of oxygen is greater than a threshold value.

9. The method of claim 8, wherein the engine operation data comprises at least one of an air intake flow rate, a fuel flow rate, an air-to-fuel ratio, an ignition timing, a fuel injection timing, a temperature of the exhaust flow, a pressure of the exhaust flow, a temperature of the engine, a pressure of a cylinder of the engine, a speed of the engine, or a power output of the engine.

10. The method of claim 8, wherein the estimated amount of oxygen is determined based on a difference between an amount of oxygen in a charge flow and an amount of oxygen consumed during combustion.

11. The method of claim 10, wherein the amount of oxygen in the charge flow is determined based on fresh air flow data acquired from one or more sensors, and wherein the amount of oxygen consumed during combustion is determined based on an amount of fueling.

12. The method of claim 8, wherein the first NOx sensor comprises an oxygen sensor.

13. The method of claim 8, the method further comprising:
   interpreting second oxygen data acquired by a second NOx sensor indicative of a second measurement of the amount of oxygen in the exhaust flow at a second location in or proximate to the exhaust aftertreatment system; and
   interpreting third oxygen data acquired by a third NOx sensor indicative of a third measurement of the amount of oxygen in the exhaust flow at a third location in or proximate the exhaust aftertreatment system.

14. The method of claim 13, the method further comprising determining one of the first NOx sensor, the second NOx sensor, and the third NOx sensor is faulty based on one of the first measurement of the amount of oxygen, the second measurement of the amount of oxygen, or the third measurement of the amount of oxygen being different from the other two of the first measurement of the amount of oxygen, the measurement of the second amount of oxygen, and the third measurement of the amount of oxygen.

15. A system, comprising:
   a controller comprising a processing circuit having a processor coupled to a memory storing instructions that, when executed by the processing circuit, cause the processing circuit to perform comprising:
      interpret first oxygen data acquired by a first NOx sensor indicative of a first measurement of an amount of oxygen in an exhaust flow at a location in or proximate to an exhaust aftertreatment system, wherein the exhaust aftertreatment system is in exhaust gas receiving communication with an engine;
      estimate the amount of oxygen in the exhaust flow entering the exhaust aftertreatment system from the engine using engine operation data; and
      determine that the first NOx sensor is faulty based on determining that a difference between the first measurement of the amount of oxygen and the estimated amount of oxygen is greater than a threshold value.

16. The system of claim 15, wherein the engine operation data comprises at least one of an air intake flow rate, a fuel flow rate, an air-to-fuel ratio, an ignition timing, a fuel injection timing, a temperature of the exhaust flow, a pressure of the exhaust flow, a temperature of the engine, a pressure of a cylinder of the engine, a speed of the engine, or a power output of the engine.

17. The system of claim 15, wherein the estimated amount of oxygen is determined based on a difference between an amount of oxygen in a charge flow and an amount of oxygen consumed during combustion.

18. The system of claim 15, wherein the first NOx sensor comprises an oxygen sensor, wherein the oxygen sensor includes a wide-band oxygen sensor.

19. The system of claim 15, the operations further comprising:
   interpret second oxygen data acquired by a second NOx sensor indicative of a second measurement of the amount of oxygen in the exhaust flow at a second location in or proximate to the exhaust aftertreatment system; and
   interpret third oxygen data acquired by a third NOx sensor indicative of a third measurement of the amount of oxygen in the exhaust flow at a third location in or proximate to the exhaust aftertreatment system.

20. The system of claim 19, the operations further comprising:
   determine one of the first NOx sensor, the second NOx sensor, and the third NOx sensor is faulty based on one of the first measurement of the amount of oxygen, the second measurement of the amount of oxygen, or the third measurement of the amount of oxygen being different from the other two of the first measurement of the amount of oxygen, the second measurement of the amount of oxygen, and the third measurement of the amount of oxygen.

* * * * *